(12) United States Patent
Perreault et al.

(10) Patent No.: US 9,374,020 B2
(45) Date of Patent: Jun. 21, 2016

(54) STACKED SWITCHED CAPACITOR ENERGY BUFFER CIRCUIT ARCHITECTURE

(71) Applicants: David J. Perreault, Brookline, MA (US); Khurram K. Afridi, Lexington, MA (US); Minjie Chen, Cambridge, MA (US); Steven B. Leeb, Belmont, MA (US); Arthur Hsu Chen Chang, Irvine, CA (US)

(72) Inventors: David J. Perreault, Brookline, MA (US); Khurram K. Afridi, Lexington, MA (US); Minjie Chen, Cambridge, MA (US); Steven B. Leeb, Belmont, MA (US); Arthur Hsu Chen Chang, Irvine, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 329 days.

(21) Appl. No.: 14/233,912

(22) PCT Filed: Jan. 17, 2013

(86) PCT No.: PCT/US2013/021926
§ 371 (c)(1),
(2) Date: Jan. 21, 2014

(87) PCT Pub. No.: WO2013/109743
PCT Pub. Date: Jul. 25, 2013

(65) Prior Publication Data
US 2014/0313781 A1 Oct. 23, 2014

Related U.S. Application Data

(60) Provisional application No. 61/587,308, filed on Jan. 17, 2012, provisional application No. 61/594,990, filed on Feb. 3, 2012.

(51) Int. Cl.
*H02J 1/00* (2006.01)
*H02M 7/537* (2006.01)
*H01G 4/38* (2006.01)
*H02M 7/217* (2006.01)
(Continued)

(52) U.S. Cl.
CPC ............. *H02M 7/537* (2013.01); *H01G 4/30* (2013.01); *H01G 4/38* (2013.01); *H02J 5/00* (2013.01); *H02M 7/217* (2013.01); *Y02T 10/7022* (2013.01)

(58) Field of Classification Search
CPC ........ H02M 7/537; H02M 7/217; H01G 4/30; H01G 4/38; H02J 5/00
See application file for complete search history.

(56) References Cited

U.S. PATENT DOCUMENTS 5,561,597 A 10/1996 Limpaecher
5,744,988 A 4/1998 Condon et al.
(Continued)

FOREIGN PATENT DOCUMENTS

WO WO 2013/109719 A1 7/2013
WO WO 2013/109743 A2 7/2013
(Continued)

OTHER PUBLICATIONS

PCT International Preliminary Report on Patentability for PCT/US2013/024552 dated Aug. 14, 2014; 9 pages.
(Continued)

*Primary Examiner* — Daniel Cavallari
(74) *Attorney, Agent, or Firm* — Daly, Crowley, Mofford and Durkee, LLP

(57) ABSTRACT

Described herein is a stacked switched capacitor (SSC) energy buffer circuit architecture and related design and control techniques.

7 Claims, 14 Drawing Sheets

(51) Int. Cl.
*H02J 5/00* (2016.01)
*H01G 4/30* (2006.01)

(56) References Cited

U.S. PATENT DOCUMENTS

| | | | |
|---|---|---|---|
| 7,535,133 | B2 | 5/2009 | Perreault et al. |
| 7,589,605 | B2 | 9/2009 | Perreault et al. |
| 7,889,519 | B2 | 2/2011 | Perreault et al. |
| 8,026,763 | B2 | 9/2011 | Dawson et al. |
| 8,212,541 | B2 | 7/2012 | Perreault et al. |
| 8,451,053 | B2 | 5/2013 | Perreault et al. |
| 8,718,188 | B2 | 5/2014 | Balteanu et al. |
| 8,824,978 | B2 | 9/2014 | Briffa et al. |
| 8,829,993 | B2 | 9/2014 | Briffa et al. |
| 8,830,710 | B2 | 9/2014 | Perreault et al. |
| 2004/0125618 | A1 | 7/2004 | DeRooij et al. |
| 2005/0162144 | A1 | 7/2005 | Kernahan |
| 2005/0213267 | A1* | 9/2005 | Azrai ............... H02M 3/07 361/15 |
| 2005/0286278 | A1 | 12/2005 | Perreault et al. |
| 2008/0032473 | A1 | 2/2008 | Bocek et al. |
| 2008/0265586 | A1 | 10/2008 | Like et al. |
| 2009/0002066 | A1 | 1/2009 | Lee et al. |
| 2009/0059630 | A1 | 3/2009 | Williams |
| 2010/0126550 | A1 | 5/2010 | Foss |
| 2011/0026281 | A1 | 2/2011 | Chapman et al. |
| 2011/0193515 | A1 | 8/2011 | Wu et al. |
| 2011/0221346 | A1 | 9/2011 | Lee et al. |
| 2011/0221398 | A1 | 9/2011 | Ferber, Jr. |
| 2011/0273020 | A1 | 11/2011 | Balachandreswaran et al. |
| 2012/0119676 | A1* | 5/2012 | Yao ............... H01F 38/42 315/297 |
| 2013/0241625 | A1 | 9/2013 | Perreault et al. |
| 2014/0120854 | A1 | 5/2014 | Briffa et al. |
| 2014/0167513 | A1 | 6/2014 | Chang et al. |
| 2014/0339918 | A1 | 11/2014 | Perreault et al. |
| 2014/0355322 | A1 | 12/2014 | Perreault et al. |
| 2015/0023063 | A1 | 1/2015 | Perreault et al. |
| 2015/0084701 | A1 | 3/2015 | Perreault et al. |

FOREIGN PATENT DOCUMENTS

| | | |
|---|---|---|
| WO | WO 2013/109797 A1 | 7/2013 |
| WO | WO 2013/116814 A1 | 8/2013 |

OTHER PUBLICATIONS

U.S. Appl. No. 14/416,654, filed Jan. 23, 2015, Perreault, et al.
U.S. Appl. No. 14/416,737, filed Feb. 11, 2015, Perreault, et al.
U.S. Appl. No. 14/401,981, filed Nov. 18, 2014, Perreault.
U.S. Appl. No. 14/435,914, filed Apr. 15, 2015, Perreault, et al.
U.S. Appl. No. 14/758,033, filed Jun. 26, 2015, Perreault, et al.
U.S. Appl. No. 14/791,685, filed Jul. 6, 2015, Perreault, et al.
U.S. Appl. No. 14/837,616, filed Aug. 27, 2015, Briffa, et al.
U.S. Appl. No. 14/823,220, filed Aug. 11, 2015, Barton, et al.
U.S. Appl. No. 14/934,760, filed Nov. 6, 2015, Briffa, et al.
U.S. Appl. No. 14/920,031, filed Oct. 22, 2015, Briffa, et al.
U.S. Appl. No. 14/968,045, filed Dec. 14, 2015, Perreault et al.
U.S. Appl. No. 14/974,563, filed Dec. 18, 2015, Perreault et al.
U.S. Appl. No. 14/975,742, filed Dec. 19, 2015, Perreault et al.
PCT International Preliminary Report on Patentability for PCT/US2013/021886 dated Jul. 31, 2014 9 pages.
PCT International Preliminary Report on Patentability for PCT/US2013/021926 dated Jul. 31, 2014 9 pages.
PCT International Preliminary Report on Patentability for PCT/US2013/022001 dated Jul. 31, 2014 9 pages.
U.S. Appl. No. 13/744,352, filed Jan. 17, 2013, Perreault et al.
U.S. Appl. No. 14/232,103, filed Jan. 10, 2014, Chang et al.
Chang et al.; "A Systems Approach to Photovoltaic Enemy Extraction;" 27th Annual IEEE Applied Power Electronics Conference and Exposition; Feb. 5-9, 2012; 18 pages.
Pease; "What's All This Common-Centroid Stuff, Anyhow?;" Electronic Design; Oct. 1, 1996; 4 pages.
PCT Search Report and Written Opinion of the ISA dated May 31, 2013; for PCT Pat. App. No. PCT/US2013/21886; 12 pages.
PCT Search Report and Written Opinion of the ISA dated Jul. 26, 2013; for PCT Pat. App. No. PCT/US2013/21926; 12 pages.
PCT Search Report and Written Opinion of the ISA dated May 3, 2013; for PCT Pat. App. No. PCT/US2013/22001; 15 pages.
PCT Search Report and Written Opinion of the ISA dated Jun. 10, 2013; for PCT Pat. App. No. PCT/US2013/24552; 14 pages.
Notice of Allowance dated Mar. 30, 2016; for U.S. Pat. No. 14/232,103; 17 pages.

* cited by examiner

STACKED SWITCHED CAPACITOR ENERGY BUFFER CIRCUIT ARCHITECTURE

RELATED APPLICATIONS

This application is a U.S. National Stage entry under 35 U.S.C. §371 of PCT Application No. PCT/US2013/021926 (filed Jan. 17, 2013), which is incorporated here by reference in its entirety.

BACKGROUND

As is known in the art, power conversion systems that interface between direct current (DC) and alternating current (AC) require an energy storage capability (or an energy buffer) which provides buffering between a constant power desired by a DC source or a load and a continuously varying power desired for an AC system.

SUMMARY

In accordance with the concepts, systems, circuits and techniques described herein, a switched capacitor based energy buffer architecture that restricts the apparent voltage ripple while utilizing a large fraction of energy in stored in capacitors is described. The switched capacitor based energy buffer architecture allows successfully replacement of electrolytic capacitors with film capacitors to achieve longer lifetimes while at the same time maintaining small volume.

In accordance with the concepts, systems, circuits and techniques described herein, a stacked switched capacitor (SSC) energy buffer circuit comprises a plurality of series-connected blocks of switches and capacitors. The capacitors are of a type that can be efficiently charged and discharged over a wide voltage range over a buffering time period of interest (e.g., film capacitors for line-frequency applications, and electrolytic capacitors or ultracapacitors for mechanical system time scale applications). Thus, selection of the particular capacitor type and characteristics depends, at least in part, upon the particular application and the buffering time period. In some embodiments, ultra-capacitors or electrolytic capacitors could be used. The switches are disposed to selectively couple the capacitors to enable dynamic reconfiguration of both the interconnection among the capacitors and their connection to a buffer port. The switches are cooperatively operated as a switching network such that the voltage seen at the buffer port varies only over a small range as the capacitors charge and discharge over a wide range to buffer energy.

With this particular arrangement, an energy buffer circuit having an effective energy density which is relatively high compared with the effective energy density of conventional energy buffer circuits is provided. In some embodiments, efficiency can be extremely high because the switching network need operate at relatively low (e.g. line-scale) switching frequencies, and the system can take advantage of soft charging or adiabatic charging of the energy storage capacitors to reduce loss. Moreover, the stacked switched capacitor buffer architecture described herein exhibits losses that reduce as energy buffering requirements reduce such that high efficiency can be achieved across an entire desired operating range.

In accordance with a further aspect of the concepts, systems, circuits and techniques described herein a grid interface power converter comprises an first filter having a first port adapted to receive an input voltage from a DC source, a resonant high frequency isolated DC-DC converter having a first port coupled to a second port of the first filter, a resonant high frequency inverter having a first port coupled to a second port of the resonant high frequency isolated DC-DC converter and having a second port coupled to a first port of a second filter with the second filter having a second port adapted to receive an input voltage from a AC source. The grid interface power converter further comprises a stacked switched capacitor (SSC) energy buffer circuit coupled between the second port of the resonant high frequency isolated DC-DC converter and the first port of the resonant high frequency inverter. By appropriately modifying switch states of the SSC energy buffer circuit, the SSC energy buffer circuit absorbs and delivers energy over a wide individual capacitor voltage range, while maintaining a narrow-range voltage at the input port. This enables maximal utilization of the energy storage capability.

In accordance with a further aspect of the concepts, systems, circuits and techniques described herein a grid interface power converter comprises a DC-DC converter having a first port adapted to connect to a DC source or load, a DC-AC converter having a first port coupled to a second port of the DC-DC converter and having a second port adapted to connect to a AC source or load. The grid interface power converter further comprises a stacked switched capacitor (SSC) energy buffer circuit coupled between the second port of the DC-DC converter and the first port of the DC-AC converter. By appropriately modifying switch states of the SSC energy buffer circuit, the SSC energy buffer circuit absorbs and delivers energy over a wide individual capacitor voltage range, while maintaining a narrow-range voltage at the input port. This enables relatively high utilization, and in some cases maximal utilization, of the energy storage capability.

With this particular arrangement, an energy buffering approach applicable to a wide range of grid-interface power electronic applications is provided. Grid-interface power electronic applications include but are not limited to photovoltaic inverters, motor drives, power supplies, off-line LED drivers and plug-in hybrid electric vehicle chargers. Use of the energy buffering approach described herein results in improved reliability and lifetime in these and other applications.

In one embodiment, a stacked switched capacitor (SSC) energy buffer circuit includes a switching network comprised of a plurality of switches and a plurality of energy storage capacitors which may be provided as film capacitors. Switches in the switching network are configured to selectively couple at least one of the energy storage capacitors in series across a bus voltage. The switching network need operate at only a relatively low switching frequency, and the system can take advantage of soft charging of the energy storage capacitors to reduce loss. Thus, efficiency of the SSC energy buffer circuit can be extremely high compared with the efficiency of other energy buffer circuits. Furthermore, since circuits utilizing the SSC energy buffer architecture need not utilize electrolytic capacitors, circuits utilizing the SSC energy buffer architecture overcome limitations of energy buffers which do utilize electrolytic capacitors. Furthermore, circuits utilizing the SSC energy buffer architecture (but not using utilizing electrolytic capacitors) can achieve an effective energy density characteristic comparable to energy buffers which utilize electrolytic capacitors. In some cases, circuits using the SSC energy buffer architecture, either with or without electrolytic capacitors, can achieve higher effective energy than a circuit using electrolytic capacitors alone for the same voltage ripple. Moreover, the SSC energy buffer architecture exhibits losses that scale with the amount of energy that must be buffered, such that a relatively high efficiency can be achieved across a desired operating range.

In accordance with a further aspect of the concepts, systems, circuits and techniques described herein, a stacked switched capacitor (SSC) energy buffer circuit having first and second terminals includes a first sub-circuit comprising one or more capacitors, a second sub-circuit comprising one or more capacitors and one or more switches disposed in at least one of said first and second sub-circuits. The one or more switches are cooperatively operated to selectively couple the one or more capacitors within and/or between the first and second sub-circuits. In a first operating mode, the first and second sub-circuits are serially coupled and the one or more switches are operable to enable dynamic reconfiguration of how the capacitors are coupled to the terminals of the sub-circuit.

In one embodiment, the one or more switches are operable to dynamically reconfigure the interconnection among the capacitors within at least one of said first and second sub-circuits.

In one embodiment, in at least some operating modes of the SSC energy buffer circuit, the one or more switches are operable to prevent the capacitors from ever being connected together at both terminals.

DETAILED DESCRIPTION

Described herein is a switched capacitor structure referred to herein as stacked switched capacitor (SSC) energy buffer circuit. Although reference is sometimes made herein to use of an energy buffer circuit in a particular application, it should be appreciated that energy buffer circuits, concepts and techniques described herein find application in a wide variety of applications. For example, many applications exist in which an energy buffer is used because either a peak power rating or a desired energy transfer rating of a first source or load is different from that of the source or load to which it interfaces. It should be recognized that the concepts, systems, circuits and techniques described herein can be used in these applications to achieve one or more of: higher energy density/smaller size at a given voltage variation level, higher reliability by using more desirable energy storage elements.

The SSC energy buffer circuit provides a small variation of a bus voltage, $V_{bus}$ while also providing high utilization of available peak energy storage capacity. In one embodiment, a variation of 12.5% or less is provided while providing utilization of available peak energy storage capacity of 72.7% or better. The SSC energy buffer circuit and related techniques described herein achieves extremely high efficiency (e.g., by using film capacitors) and uses simpler circuitry. The SSC energy buffer circuit and related techniques described herein achieves extremely high energy density e.g., by incorporating film capacitors, electrolytic capacitors or ultracapacitors and employing them over a wider voltage range than appears at the input port. The SSC energy buffer circuit and related techniques described herein provide performance characteristics comparable to or better than conventional energy buffer circuits while at the same time utilizing fewer switches and capacitors than conventional energy buffer circuits. The SSC energy buffer circuit includes a number of variations as will be described herein.

Figure 1A:
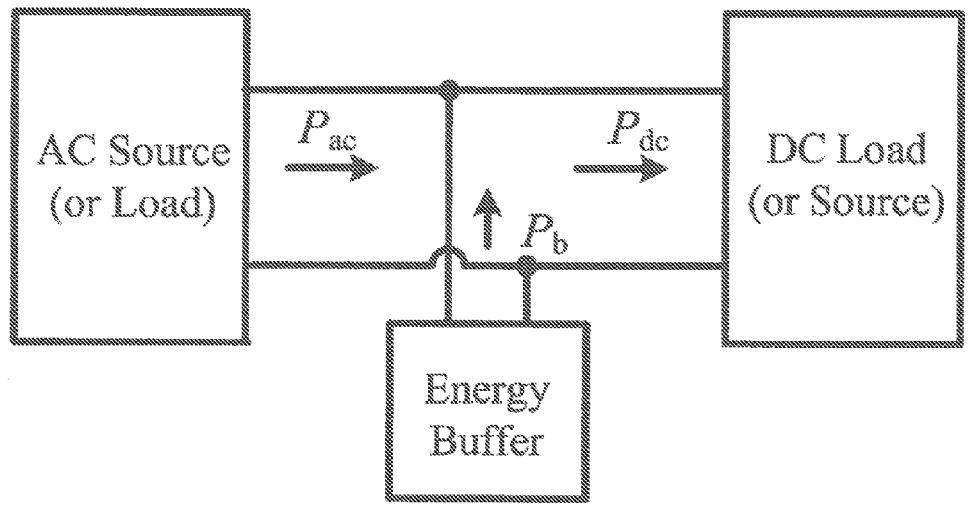
FIG. 1A is a block diagram of an energy buffer circuit coupled between an AC source (or load) and a DC load (or source).

Power conversion systems that interface between dc and single-phase ac need energy storage to provide buffering between the constant power desired for a dc source or load and the continuously-varying power desired for a single-phase ac system, as illustrated in FIG. 1. Applications for such buffering include power supplies, solar photovoltaic inverters, electric vehicle chargers and grid-connected light emitting diode (LED) drivers. Assuming unity power factor, the power from or to the single-phase ac system, Pac(t), varies sinusoidally at twice-line frequency (120 Hz in the US)

between zero and twice its average value, Pavg, with average ac system power equaling the dc system power, Pdc:

$$Pac(t)=Pdc(1-\cos(2\omega_{line}t))$$ Equation (1)

Here $\omega_{line}$ is the line's angular frequency ($2\pi \times 60$ rad/s for the US). The difference in instantaneous power between source and load must be absorbed or delivered by the energy buffer:

$$Pb(t)=Pdc-Pac(t)=P_{dc}\cos(2\omega_{line}t).$$ Equation (2)

The peak energy that needs to be buffered, Eb, is the total energy delivered to (or extracted from) the buffer during a half-line cycle and given by:

$$Eb=P_{dc}/\omega_{line}$$ Equation (3)

Since the peak buffered energy depends only on the dc system power and the line frequency, the volume of the energy buffer cannot be reduced simply by Increasing the switching frequency of a power electronic converter interfacing the single-phase ac and dc systems.

Today, electrolytic capacitors are generally used to provide high-density energy storage for buffering. However, it is widely appreciated that despite providing the best available energy density, electrolytic capacitors represent a significant source of system lifetime and reliability problems. On the other hand, film capacitors have much higher reliability and lifetime, but considerably lower peak energy density. Hence, the development of energy buffering architectures that eliminate electrolytic capacitors while maintaining high energy storage density and high efficiency is important for future grid interface systems that have small size and high reliability.

While electrolytic capacitors provide much higher peak energy density than film capacitors (by an order of magnitude), electrolytic capacitors can only be operated over a narrow charge/discharge range (corresponding to a small voltage ripple) at 120 Hz for thermal and efficiency reasons. These considerations directly limit the energy buffering capability of electrolytic capacitors at 120 Hz. Thus, while peak energy densities of up to 0.8 J=cm3 can typically be achieved with commercially available electrolytic capacitors at the voltage and power levels we consider, the allowable energy swing at 120 Hz yields practical energy densities that are significantly lower. Film capacitors typically have peak energy densities of only about 0.1 J=cm3. Therefore, if electrolytic capacitors are simply replaced by film capacitors (with similar voltage swing constraints), the passive volume would roughly increase by an order of magnitude, which is usually unacceptable. However, film capacitors have considerably lower series resistance compared to electrolytic capacitors which allows them to be efficiently charged and discharged over a much wider energy range. Using a large fraction of the capacitor's stored energy results in large voltage swings, which is also unacceptable in most applications. Therefore, if electrolytic capacitors are to be replaced by film capacitors while maintaining high energy density, this wide variation in capacitor voltage must somehow be curtailed.

In past efforts, bidirectional dc-dc converters have been employed to effectively utilize film capacitors while maintaining a desired narrow-range bus voltage. While this approach is flexible in terms of it use, it unfortunately leads to low buffering efficiency if high power density is to be maintained, due to losses in the dc-dc converter. Other systems have incorporated the required energy buffering as part of the operation of the grid interface power stage. This can offset a portion of the buffering loss associated with introduction of a complete additional power conversion stage, but still introduces high-frequency loss and is quite restrictive in terms of operation and application.

An alternative approach relies on switched capacitor circuits. Switched capacitor circuits that reconfigure capacitors between parallel and series combinations have been used to improve the energy utilization of ultra-capacitors. A simple version of this parallel-series switched capacitor circuit is shown in FIG. 2. While this circuit has a high energy buffering ratio of 93.75%, it suffers from a large voltage ripple ratio of 33.3%.

Energy buffering ratio ($\Gamma_b$) is defined as the ratio of the energy that can be injected and extracted from an energy buffer in one cycle to the total energy capacity of the buffer, i.e., $\Gamma_b=(E_{max}-E_{min})/E_{rated}$, where $E_{max}$ and $E_{min}$ are the maximum and minimum values of energy stored in the energy buffer during normal operation, and $E_{rated}$ is the total energy capacity of the energy buffer.

Voltage ripple ratio ($R_v$) is defined as the ratio of the peak voltage ripple amplitude to the nominal (or average) value of the voltage, i.e., $R_v=(Vmax-Vmin)/2$ Vnom where Vmax, Vmin and Vnom are the maximum, minimum and nominal values of the voltage, respectively.

More complex parallel-series switched capacitor circuits which achieve better voltage ripple ratio have also been developed. However, they suffer from high circuit complexity when high energy utilization and small voltage ripple are required. For example, in some cases the circuit with the best performance in (e.g. the 8-6-5-4-3 parallel-series switched capacitor circuit) has energy utilization of 92.09% and a voltage ripple ratio of 14.3%. However, it needs 41 switches and 120 capacitors. This makes it overly complicated for practical use.

Figure 1B:
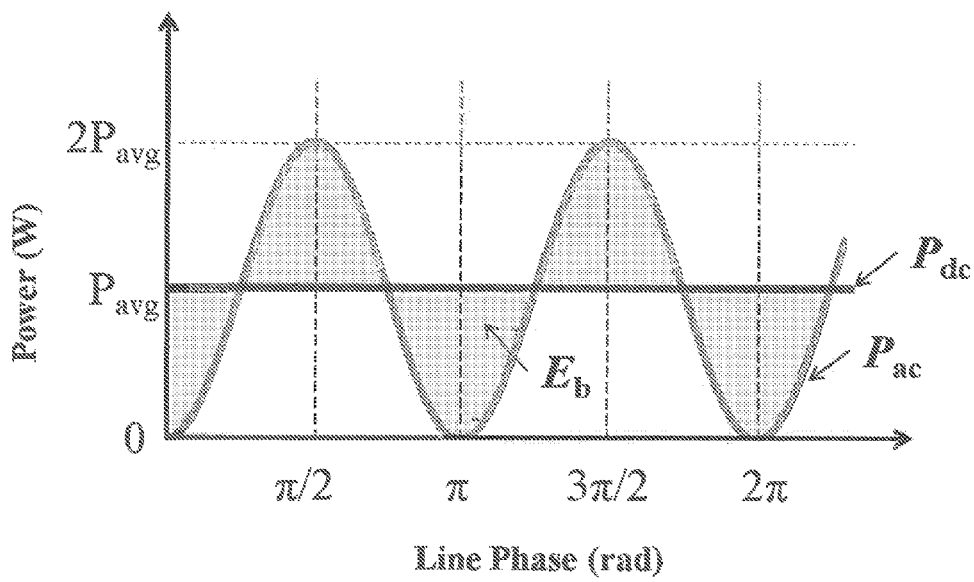
FIG. 1B is a plot of Power (W) vs. Line Phase (rad) which illustrates a mismatch in instantaneous power between single-phase ac, Pac, and constant power dc, Pdc.
Figures 2A, 2B, 2C:
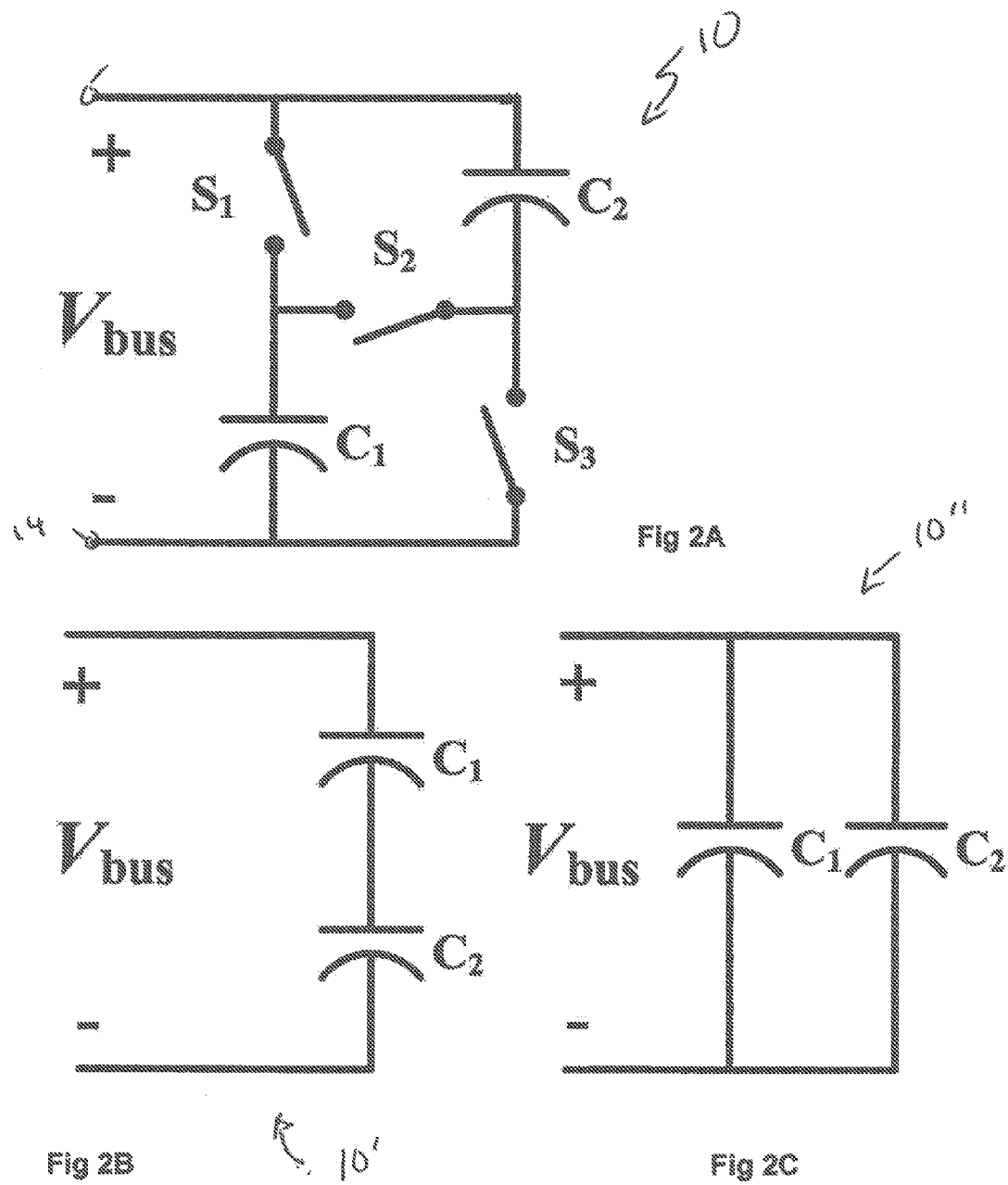
FIG. 2A is circuit diagram of a parallel-series switched capacitor circuit.
FIGS. 2B and 2C are circuit diagrams of two configurations associated with FIG. 1A for different switch states.

Referring to FIGS. 2A to 2C, switched capacitor circuits that reconfigure capacitors between parallel and series combinations have been used to improve the energy utilization of ultracapacitors. A circuit 10 is a simple version of a parallel-series switched capacitor circuit. The circuit 10 includes switches $S_1$, $S_2$, $S_3$ and two capacitors $C_1$ and $C_2$. The circuit 10 also includes a terminal 12 and a terminal 14 (collectively referred to herein as a buffer port) to provide a bus voltage, $V_{bus}$, cross the terminals 12, 14. When switches $S_1$ and $S_3$ are open and $S_2$ is closed, the resulting configuration is represented by a circuit 10' as shown in FIG. 1B depicting capacitors $C_1$ and $C_2$ in series. When switches St and $S_3$ are closed and $S_2$ is open, the resulting configuration is represented by a circuit 10" shown in FIG. 1C depicting capacitors $C_1$ and $C_2$ in parallel.

While the circuit 10 has a high capacitor energy utilization of 93.75% which is relatively high compared with prior art approaches, but the circuit 10 also has a voltage ripple ratio of 33.3% which is also relatively high compared with prior art approaches. That is, the value of the bus voltage, $V_{bus}$, varies by as much as 33.3%. For example, in one embodiment, the voltage of the dc bus varies from $0.67V_{nom}$ to $1.33V_{nom}$ where $V_{nom}$ is the average (nominal) value of the bus voltage. More complex parallel-series switched capacitor circuits have also been developed which achieve a better voltage ripple ratio; however, these complex parallel-series switched capacitors have high circuit complexity when high energy utilization and small voltage ripple are required. For example, the circuit with the best performance (e.g., a 8-6-5-4-3 parallel-series switched capacitor circuit) has an energy utilization of 92.09% and a voltage ripple ratio of 14.3%, but requires 41 switches and 120 capacitors making the circuit overly complicated for practical use.

Figure 3:
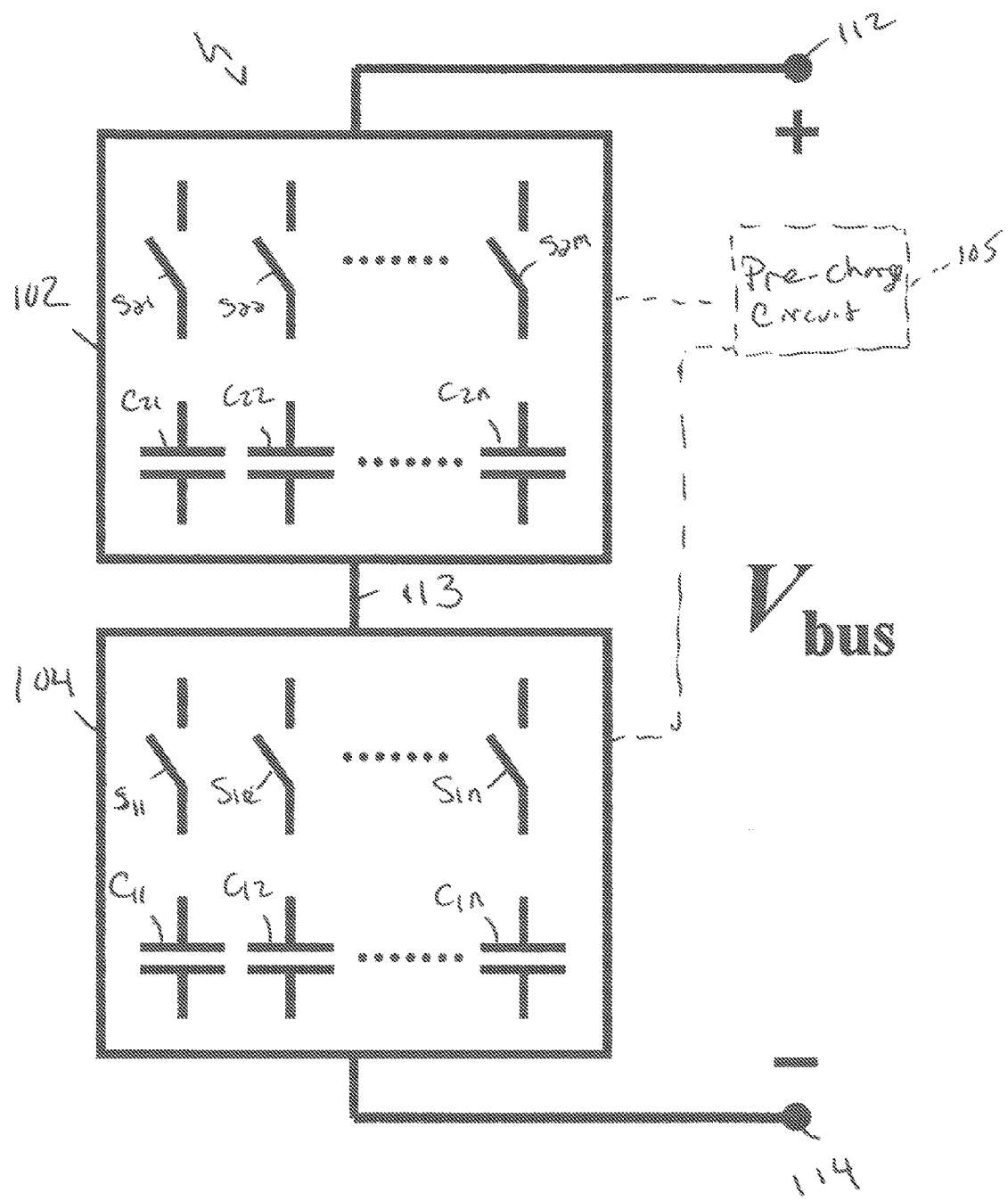
FIG. 3 is a block diagram of a general architecture for a stacked switched capacitor (SSC) energy buffer circuit.

FIG. 3 shows the general architecture of a stacked switched capacitor (SSC) energy buffer. It is composed of two series connected blocks of switches and capacitors. The capacitors are of a type that can be efficiently charged and discharged over a wide voltage range (e.g., film capacitors). The switches enable dynamic reconfiguration of both the interconnection among the capacitors and their connection to the buffer port (Vbus). The SSC energy buffer works on the principle that its individual buffer capacitors absorb and deliver energy without tightly constraining their individual terminal voltages, but maintain a narrow range voltage at the buffer port. The switching network is operated such that the voltage seen at the buffer port varies only over a small range as the capacitors charge and discharge over a wide range to buffer energy. This enables high effective energy density through maximum utilization of the capacitor energy storage capability. Efficiency of the SSC energy buffer can be extremely high because the switching network need operate at only very low (line-scale) switching frequencies, and the system can take advantage of soft charging of the energy storage capacitors to reduce loss. Moreover, the proposed buffer architecture exhibits losses that scale with the amount of energy that must be buffered, such that high efficiency can be achieved across the full operating range.

Referring to FIG. 3, a stacked switched capacitor (SSC) energy buffer circuit 100 overcomes the deficiencies of the switched capacitor circuits like that of the circuit 10. The SSC energy buffer circuit 100 includes a first set of circuitry 102 and a second set of circuitry 104 connected in series. SSC energy buffer circuit 100 further includes a pre-charge circuit 105. For reasons which will become apparent from the description provided herein below, pre-charge circuit 105 is coupled to each of the two sub-circuits 102, 104 and pre-charge circuit 105 is operable to charge each of one or more capacitors in two sub-circuits 102, 104 to specified initial conditions before entering a first operating mode. In some cases, the pre-charge circuit 105 may be coupled in series with each of the two sub-circuits 102, 104 before entering a first operating mode, and further connections of the pre-charge circuit 105 to capacitors within the two sub-circuits 102, 104 may be made with switches in the two sub-circuits 102, 104

The circuit 100 also includes a terminal 112, a terminal 113 and a terminal 114. Terminals 112, 114 collectively form a buffer port to provide the bus voltage, $V_{BUS}$. Each set of circuitry 102, 104 includes capacitors.

As illustrated in FIG. 3, the first set of circuitry 102 includes capacitors $C_{11}, C_{12}, \ldots, C_{1n}$ and the second set of circuitry 104 includes capacitors $C_{21}, C_{22}, \ldots, C_{2m}$ where n and m are integers greater than or equal to one. The capacitors $C_{11}, C_{12}, \ldots, C_{1n}, C_{21}, C_{22}, \ldots, C_{2m}$, are of a type that can be efficiently charged and discharged over a wide voltage range (e.g., film capacitors electrolytic capacitors and ultra capacitors).

Each set of circuitry also includes switches. As illustrated in FIG. 3, the first set of circuitry 102 includes switches $S_{11}, S_{12}, \ldots, S_{1n}$ and the second set of circuitry 104 includes switches $S_{21}, S_{22}, \ldots, S_{2m}$ connected in series with a respective one capacitor. For example, the switch $S_{11}$ is in series with the capacitor $C_{11}$, the switch $S_{12}$ is in series with the capacitor $C_{12}$, the switch $S_{21}$ is in series with the capacitor $C_{21}$, the switch $S_{22}$ is in series with the capacitor $C_{22}$ and so forth. The switches $S_{11}, S_{12}, \ldots, S_{1m}$ and $S_{21}, S_{22}, \ldots, S_{2n}$ enable dynamic reconfiguration of both the interconnection among the capacitors and their connection to the buffer port to provide the bus voltage, $V_{bus}$.

It should, of course, be appreciated that in some implementations there is no one-to-one correspondence between capacitors and switches, that is, a "leg" can be just a capacitor just a switch, or a switch in series with a capacitor. Also one of the blocks can have switches not associated with a "leg" to allow the "legs" of that block to be connected in reverse.

The switching in the circuit 100 (i.e., opening and closing of the switches) is preferably performed such that the voltage seen at the buffer port, $V_{bus}$, varies only over a small range as the capacitors charge and discharge over a wide voltage range to buffer energy, thereby providing a high effective energy density. By appropriately modifying the switch states, the buffer capacitors absorb and deliver energy over a relatively wide individual voltage range, while maintaining a relatively narrow-range voltage at the input port. This enables a high degree of utilization (and in some cases, even maximal utilization) of the capacitor energy storage capability. Efficiency of the circuit 100 can be extremely high because the switches in the circuit 100 need operate at only very low (line-scale) switching frequencies. Also, the circuit 100 can take advantage of soft charging of the energy storage capacitors to reduce loss. Moreover, the circuit 100 exhibits losses that reduce as energy buffering requirements reduce such that high efficiency can be achieved across the full operating range.

There are multiple embodiments of the proposed stacked switched capacitor (SSC) energy buffer. Described herein is one exemplary embodiment and its extensions.

Bipolar SSC Energy Buffer

Figure 4:
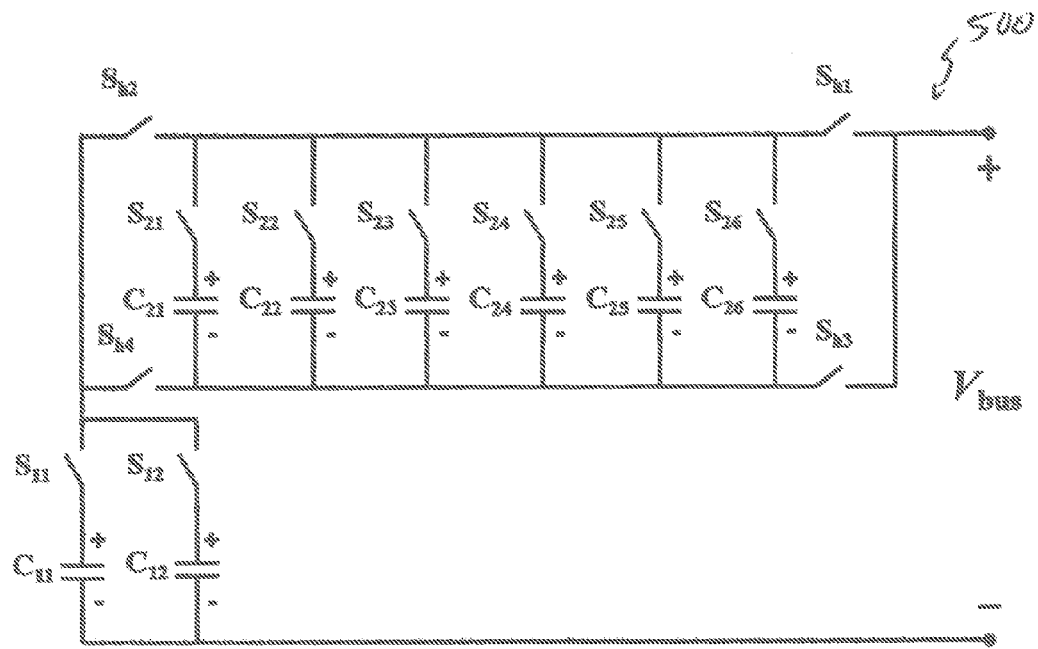
FIG. 4 is a circuit diagram of an exemplary SSC energy buffer circuit referred to as a 2-6 bipolar SSC energy buffer circuit.

FIG. 4 shows an example embodiment of the stacked switched capacitor energy buffer: the 2-6 bipolar SSC energy buffer. This topology has two backbone capacitors, C11 and C12; six supporting capacitors, C21, C22, C23, C24, C25, and C26; and twelve switches, S11, S12, S21, S22, S23, S24, S25, S26, Sh1, Sh2, Sh3, and Sh4. This circuit can keep the bus voltage ripple within 10% of nominal value when designed and operated in the manner described below.

The eight capacitors are chosen to have identical capacitance, but different voltage ratings. The two backbone capacitors, C11 and C12, have voltage rating of 1.6 Vnom, where Vnom is the nominal value of the bus voltage (Vbus). The voltage rating of the six supporting capacitors is as follows: 0.6 Vnom for C21, 0.5 Vnom for C22, 0.4 Vnom for C23, 0.3 Vnom for C24, 0.2 Vnom for C25 and 0.1 Vnom for C26. A precharge circuit (not shown in FIG. 4, but discussed below) ensures that the following initial voltages are placed on the eight capacitors: 0.4 Vnom on C11, 0.4 Vnom on C12, 0.5 Vnom on C21, 0.4 Vnom on C22, 0.3 Vnom on C23, 0.2 Vnom on C24, 0.1 Vnom on C25, and 0V on C26.

Referring now to FIG. 4, one particular example of the circuit 500' is a circuit 500' where n=2 and m=6 also called a 2-6 bipolar stacked switched capacitor energy buffer circuit.

Exemplary circuit 500' includes a first block of parallel coupled switches and capacitors S11, C11, S12, C12 and a second block of parallel coupled switches and capacitors S21, C21, S22, C22, S23, C23, S24, C24, S25, C25, S26, C26. The first and second blocks are coupled in series across a bus voltage $V_{bus}$. Switches Sh1, Sh2, Sh3, Sh4 are disposed in the second block to provide selected signal paths between the first and second blocks.

As noted above, the capacitors are preferably of a type that can be efficiently charged and discharged over a wide voltage range (e.g., film capacitors). The switches are disposed to selectively couple the capacitors to enable dynamic reconfiguration of both the interconnection among the capacitors and their connection to a buffer port. The switches are cooperatively operated as a switching network such that the voltage seen at the buffer port varies only over a small range as the capacitors charge and discharge over a wide range to buffer energy.

By appropriately modifying switch states of the SSC energy buffer circuit, the SSC energy buffer circuit absorbs and delivers energy over a wide individual voltage range, while maintaining a narrow-range voltage at the input port. This enables maximal utilization of the energy storage capability.

Figure 5:
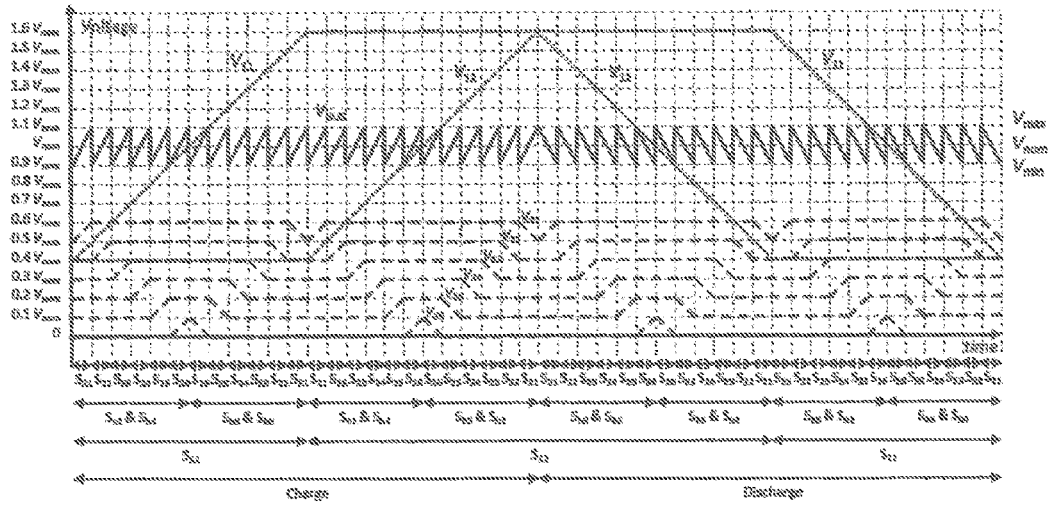
FIG. 5 is a plot which illustrates which states, individual capacitor voltages, and resulting bus voltage over a charge and discharge cycle of the 2-6 bipolar SSC energy buffer of FIG. 4.

The bipolar stacked switched capacitor energy buffer circuit (e.g., the circuit 500') previously described can also be controlled in a slightly different manner. Instead of charging the n capacitors only in series with the m capacitors, a state can be introduced by turning $S_{h3}$ and $S_{h4}$ (or $S_{h1}$ and $S_{h2}$) on at the same time in which the n capacitor is charged directly. An example of the modified control is shown in FIG. 5 for the circuit 300 (the 2-4 bipolar SSC energy buffer circuit) of FIG. 4. The modified control is described herein in the section entitled: "Enhanced Bipolar Stacked Switched Capacitor Energy Buffer"]. With this modified control, and assuming that all m and n capacitors have the same capacitance, the expression for energy buffering ratio, $\gamma_b$, becomes:

$$\gamma_b = \frac{n[(1+(m+1)R_v)^2 - (1-(m+1)R_v)^2]}{n[(1+(m+1)R_v)^2 - (2^2 + 3^3 + \ldots + (m+1)^2)R_v^2)]}$$

FIG. 5 shows the switch states, the capacitor voltages and the resulting bus voltage for the 2-6 bipolar SSC energy buffer over a complete charge and discharge cycle. When the energy buffer starts charging up from its minimum state of charge, Sh1, Sh4, S21 and S11 are turned on with all the other switches turned off. In this state, C11 and C21 are connected in series and charged until the bus voltage rises from 0.9 Vnom to 1.1 Vnom. At this instant the voltage of C21 (V21) reaches 0.6 Vnom and the voltage of C11 (V11) reaches 0.5 Vnom. Then S21 is turned off and S22 is turned on; and the bus voltage drops back down to 0.9 Vnom. Then as the charging continues, the voltage of C22 rises to 0.5 Vnom and the voltage of C11 reaches 0.6 Vnom and the bus voltage again reaches 1.1 Vnom. Next S22 is turned off, S23 is turned on and C23 is charged.

This process is repeated until C26 is charged. At this stage all the supporting capacitors are at their maximum voltage; the voltage of the backbone capacitors is: Vnom on C11 and 0.4 Vnom on C12; and the bus voltage is 1.1 Vnom. Next Sh1 and Sh4 are turned off, and Sh3 and Sh2 are turned on. This connects C26, and the other supporting capacitors, in reverse orientation with C11 and the bus voltage again drops to 0.9 Vnom. Now C11 can continue to charge up through the now reverse-connected supporting capacitors through a process similar to the one described above, except that the supporting capacitors are discharged in reverse order, i.e., first through C26, then through C25, and so on until finally through C21. At this stage C11 is fully charged to 1.6 Vnom and charging of C12 must begin. For this the h-bridge switches are again toggled (i.e., Sh3 and Sh2 are turned off, and Sh1 and Sh4 are turned on), S11 is turned off and S12 is turned on. The charging process for C12 is identical to the charging process for C11, as shown in FIG. 5. During the discharge period, the capacitors C11 and C12 are discharged one at a time through a process that is the reverse of the charging process. Hence, the voltage waveforms during the discharge period are a mirror of those in the charging period. Throughout the charging and discharging period of this energy buffer, the bus voltage stays within the range 0.9 Vnom-1.1 Vnom. Hence, the 2-6 bipolar SSC energy buffer operating in this manner has a bus voltage ripple ratio (Rv) of 10%. Furthermore, it has an energy buffering ratio ($\Gamma_b$) of 79.6%.

n-m Bipolar SSC Energy Buffer

Figure 6:
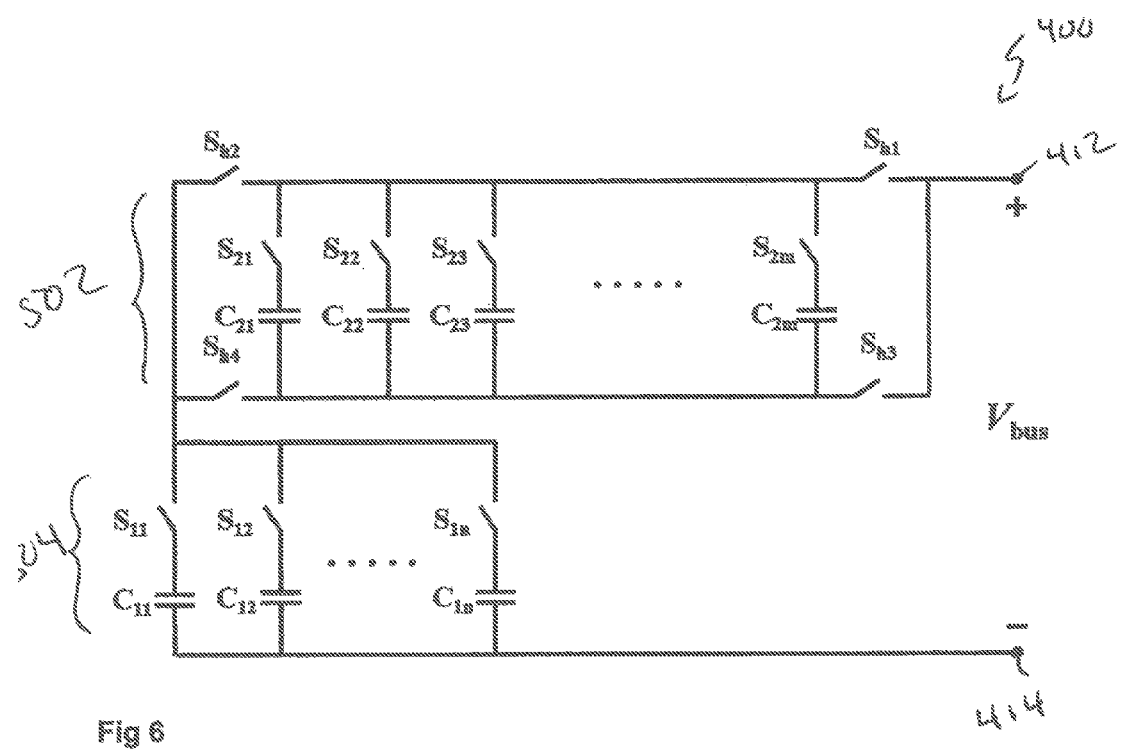
FIG. 6 is a circuit diagram of a generalized example of an SSC energy buffer circuit referred to as an n-m bipolar SSC energy buffer circuit.

The capacitors that buffer most of the energy in the circuit of FIG. 4 are the backbone capacitors C11 and C12. Therefore, by adding additional backbone capacitors in parallel with C11 and C12 the energy buffer could potentially achieve better buffering performance. The number of supporting capacitors can also be changed. To evaluate the impact of the number of backbone and supporting capacitors on the performance of the energy buffer, the topology of FIG. 4 is extended by incorporating n backbone capacitors and m supporting capacitors, as shown in FIG. 6. The energy buffering ratio for this n-m bipolar SSC energy buffer (with n backbone capacitors of equal value C1 and m supportive capacitors of equal value C2) is given by:

$$\Gamma_b = nC1(1+2mR_v(C2/(C1+C2)))^2 - (1-2mR_v(C2/(C1+C2)))^2/[nC1(1+2mR_v(C2/(C1+C2)))^2 + C2(1+2^2 + \ldots + m^2)R_v^2]$$

Equation (4)

Referring to FIG. 6, as noted above, an n-m bipolar SSC energy buffer circuit can be realized by adding more capacitors to the first and second of circuitry. 502, 504 shown in FIG. 6 circuit 500. Note that the capacitor that does the energy buffering in the circuit 500 is the capacitor $C_{11}$ in the second set of circuitry 504. Therefore, by replacing C11 alone with a plurality of "legs" in parallel, each "leg" comprising the series connection of a capacitor and switch, better buffering performance can be achieved.

The circuit 500' includes a first set of circuitry 502' and a second set of circuitry 504'. The first set of circuitry 502' includes capacitors $C_{21}, C_{22}, \ldots, C_{2m}$ (referred herein as m capacitors) and switches $S_{21}, S_{22}, \ldots, S_{2m}$ in series with a respective one capacitor, and the "legs" formed by each switch-capacitor pair in parallel. The first set of circuitry 502' also includes switches $S_{h1}, S_{h2}, S_{h3}, S_{h4}$ (e.g., an H-bridge). The second set of circuitry 504 includes capacitors $C_{11}, C_{12}, \ldots, C_{1n}$ (referred herein as n capacitors) and switches $S_{11}, S_{12}, \ldots, S_{1n}$ in series with a respective one capacitor, and the "legs" formed by each switch-capacitor pair in parallel.

The m capacitors in the first set of circuitry 502 in this case have to switch at a higher switching frequency. The energy buffering ratio for this n-m bipolar SSC energy buffer (with n capacitors of equal value $C_1$ and m capacitors with equal value $C_2$) is given by:

$$\gamma_b = \frac{nC_1\left[\left(1+2mR_v\frac{C_2}{C_1+C_2}\right)^2 - \left(1-2mR_v\frac{C_2}{C_1+C_2}\right)^2\right]}{nC_1\left[\left(1+2mR_v\frac{C_2}{C_1+C_2}\right)^2 - C_2(1+2^2+\ldots+m^2)R_v^2\right]}$$

Figure 7A:
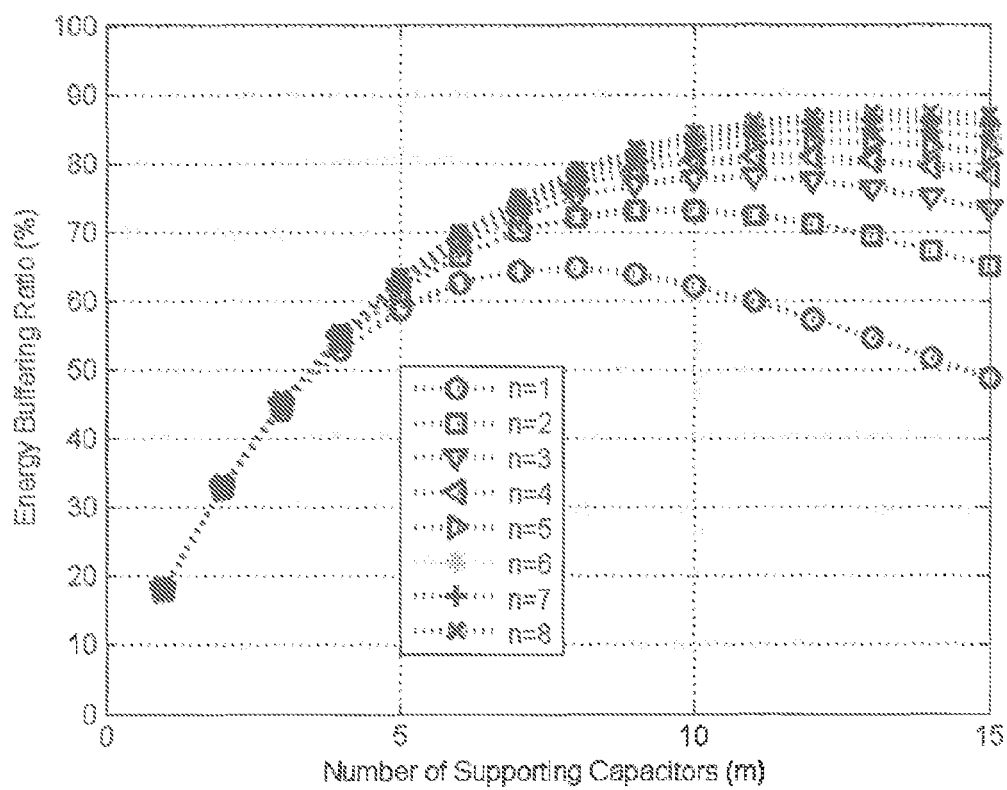
FIGS. 7A-7C are a series of plots illustrating Energy buffering ratio ($\Gamma_b$) as a function of the number of backbone capacitors n and number of supporting capacitors m for different values of voltage ripple ratio: (a) Rv=5%, (b) Rv=10% and (c) Rv=20%.
Figure 7B:
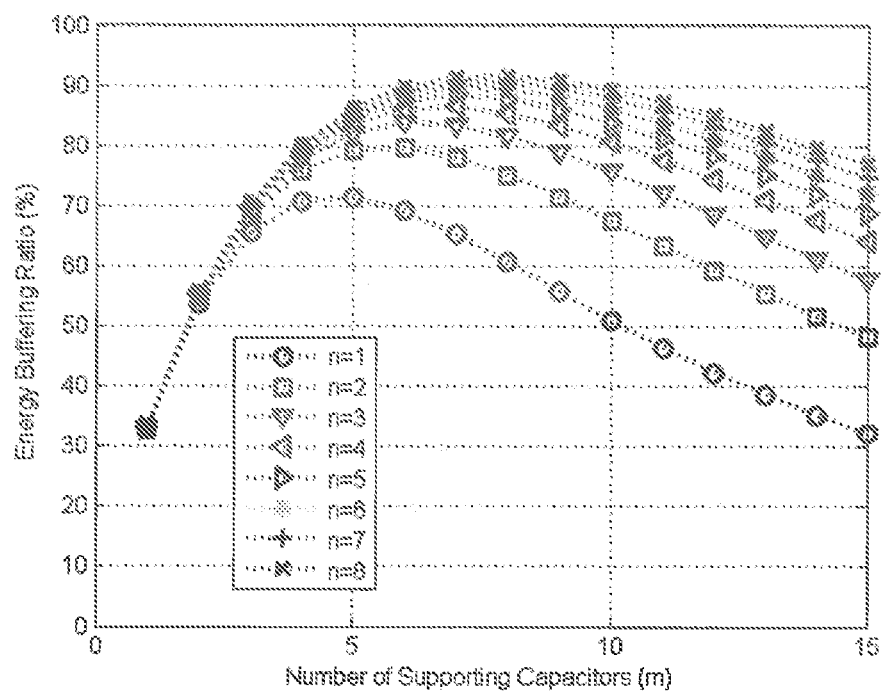
Figure 7C:
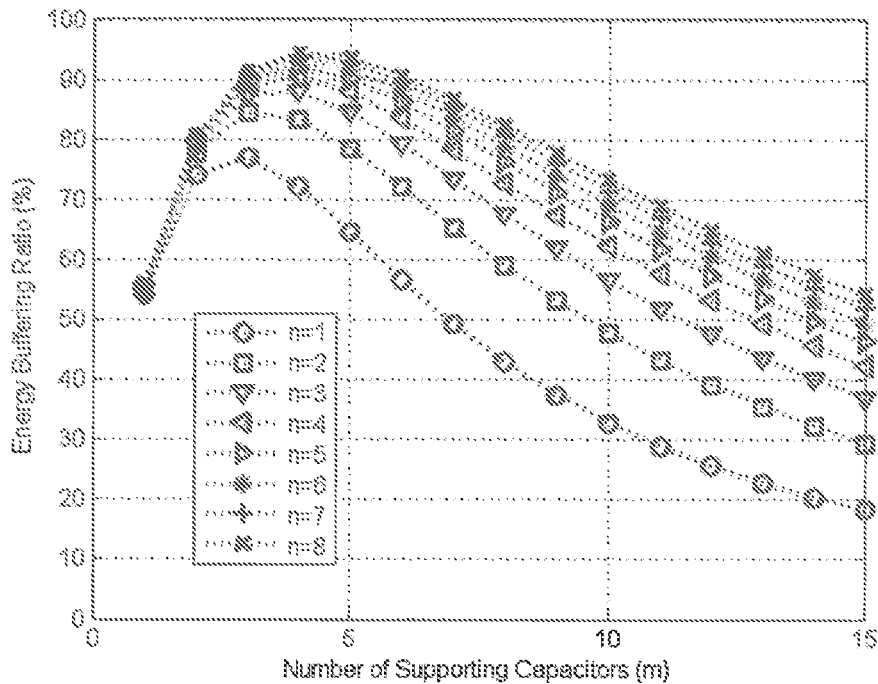

FIG. 7 shows the variation in energy buffering ratio, $\Gamma_b$, (with C1 equal to C2) as a function of the number of backbone capacitors n and the number of supporting capacitors m for three different values of voltage ripple ratio Rv. These plots indicate that there is an optimal number of supporting capacitors that should be used for a given number of backbone capacitors in order to maximize the energy buffering ratio. Note that this optimal number of supporting capacitors depends on the value of allowed voltage ripple ratio.

These plots can be used to select the optimal number of backbone and supporting capacitors to maximize the energy buffering ratio for a given bus voltage ripple ratio. If a larger voltage ripple ratio is allowed, a high energy buffering ratio can be achieved with fewer backbone and supporting capacitors. For a fixed number of backbone capacitors, a lower voltage ripple ratio requires a larger number of supporting capacitors if maximum energy buffering is to be achieved.

However, increasing the number of supporting capacitors also increases the complexity of the circuit and the switching frequency of the switches associated with the supporting capacitors (S21-S2m). For an Rv of 10% with 2 backbone capacitors, the optimal number of supporting capacitors is 6 (see FIG. 7(b)); hence our choice of the 2-6 bipolar SSC energy buffer discussed earlier to meet the 10% voltage ripple requirement. Note that for an Rv of 10%, with 8 backbone and 8 supporting capacitors, an energy buffering ratio of 91.6% can be achieved. Hence, the SSE energy buffer achieves performance similar to the 8-6-5-4-3 parallel-series switched capacitor circuit of with only 16 capacitors and 20 switches instead of 120 capacitors and 41 switches.

Figure 8:
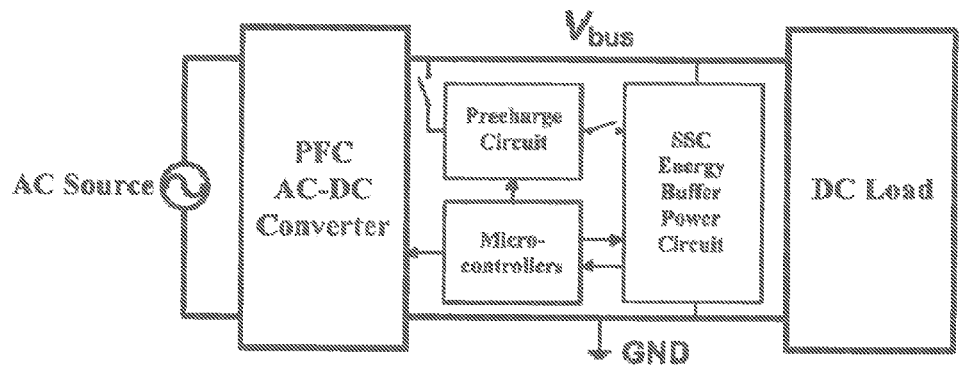
FIGS. 8 and 8A are block diagrams of a setup comprising a power factor correction (PFC) ac-dc converter, a dc load and an SSC energy buffer comprising an SSC energy buffer power circuit, a precharge circuit, and a control unit.
Figure 8A:
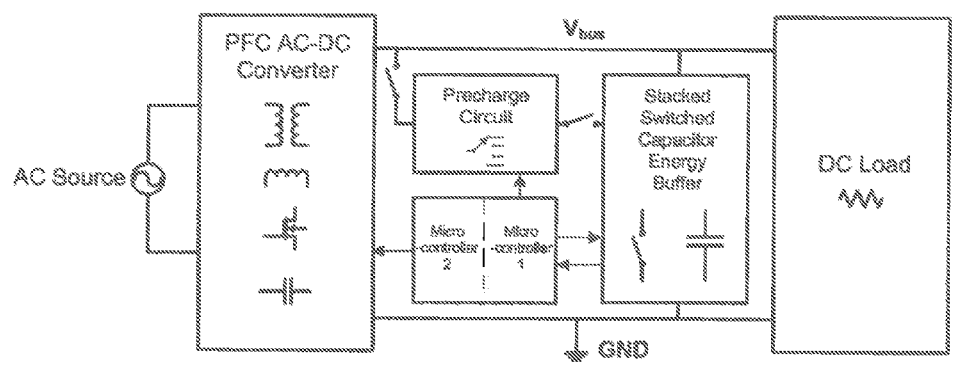

To validate the proposed concept an exemplary 2-6 bipolar SSC energy buffer, similar to the one described herein and shown in FIG. 4 was designed and built. The exemplary circuit is designed as the energy buffer for a power factor correction (PFC) front-end of a two-stage single-phase ac to dc power converter as shown in FIG. 8. The SSC energy buffer replaces the electrolytic capacitor normally connected at the output of the PFC. To simplify our implementation, a load resistor is used in place of the second-stage dc-dc converter. The SSC energy buffer is designed to meet a 10% bus voltage ripple ratio requirement on a 320 V dc bus with a maximum load of 135 W, as listed in Table I.

TABLE I

Design specifications for the exemplary 2-6 bipolar SSC energy buffer.

| Design Specification | Value |
| --- | --- |
| Maximum load power (Pload(max)) | 135 W |
| Bus voltage (Vbus) | 320 V |
| Voltage ripple ratio (Rv) | 10% |

The PFC used for this exemplary circuit is a 400 W evaluation board from STMicroelectronics that uses their transition-mode PFC controller (L6562A). This controller operates the boost PFC at the boundary between continuous and discontinuous conduction mode by adjusting the switching frequency. The evaluation board has a 330_F electrolytic capacitor at the output of the PFC, and according to the PFC datasheet can maintain a voltage ripple ratio of 2.5%, while supplying a 400 W load at a bus voltage of 400 V. It has been experimentally verified that a 40_F electrolytic capacitor is sufficient to support 135 W of output power with 10% voltage ripple ratio. The total volume of the 40_F, 450 V electrolytic capacitor used for this verification is approximately 9 cm3. The energy buffer that replaces this electrolytic capacitor consists of three functional blocks: the energy buffer power circuit, the precharge circuit and the control unit, as shown in FIG. 8. In addition, the energy buffer needs to provide a feedback signal to the PFC for its proper operation. The design of each of these four elements is discussed below.

Energy Buffer Power Circuit

As shown in FIG. 7B, to achieve a voltage ripple ratio of 10% with a two-backbone-capacitor (n=2) bipolar SSC energy buffer, the optimal number of supporting capacitors is six, (i.e., m=6). Hence in the exemplary circuit, the electrolytic capacitor is replaced by a 2-6 bipolar SSC energy buffer. To meet the 10%/voltage ripple requirement at the 320 V bus voltage and the 135 W output power level, the eight capacitors of the SSC energy buffer have to be 2.2_F each. The required voltage rating of these film capacitors is different and ranges from 32 V to 512 V as discussed in section IV. However, for simplicity and to provide adequate safety margin, 700 V film capacitors are used as the two backbone capacitors and 250 V capacitors are used as the six supporting capacitors. All the switches are implemented using silicon power MOSFETs.

Switches S11 S12, S21, S22, S23, S24, S25 and S26 are implemented with reverse voltage blocking capability.

Precharge Circuit

Figure 9:
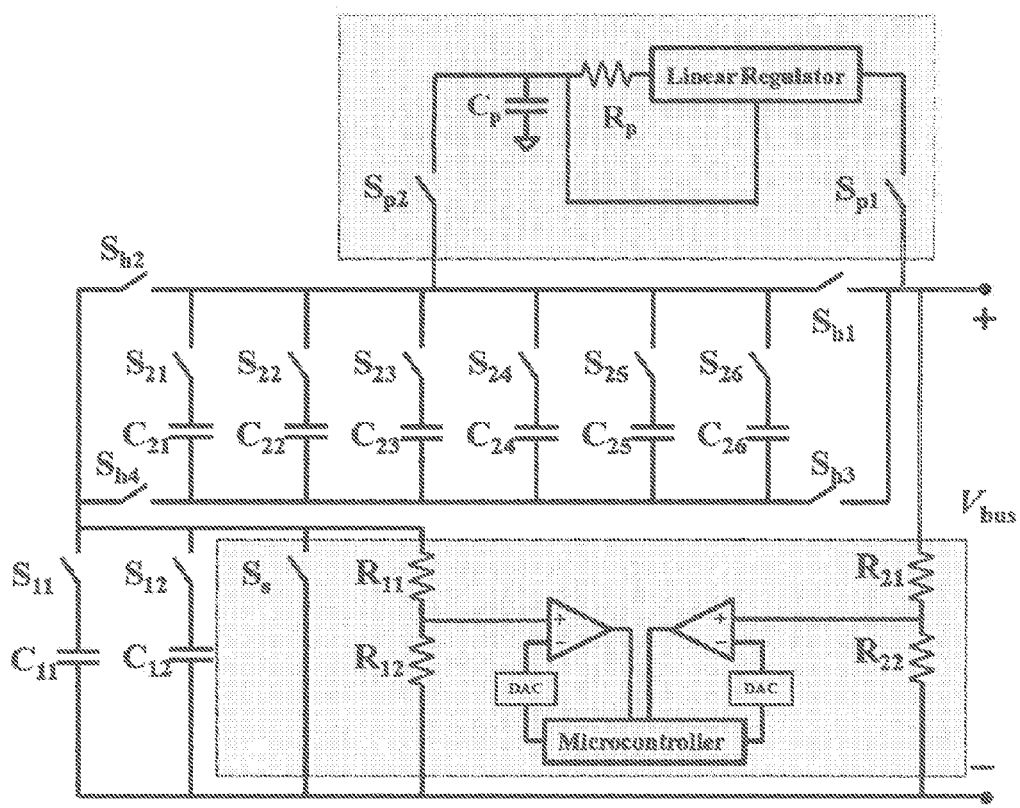
FIG. 9 is a schematic diagram of a 2-6 bipolar SSC energy buffer having a precharge circuit coupled thereto.

An important part of the SSC energy buffer is the precharge circuit. When the system starts, the precharge circuit draws power from the PFC to charge the individual capacitors of the energy buffer to the desired initial voltage levels. The precharge circuit designed here uses a linear regulator operated as a current source as shown in FIG. 9. The linear regulator used is Supertex's LR8 with a maximum output current of 20 mA. The linear regulator can be disconnected from the energy buffer power circuit by two isolating switches Sp1 and Sp2. The precharge circuit is controlled by an ATMEL ATmega2560 microcontroller.

Figure 10:
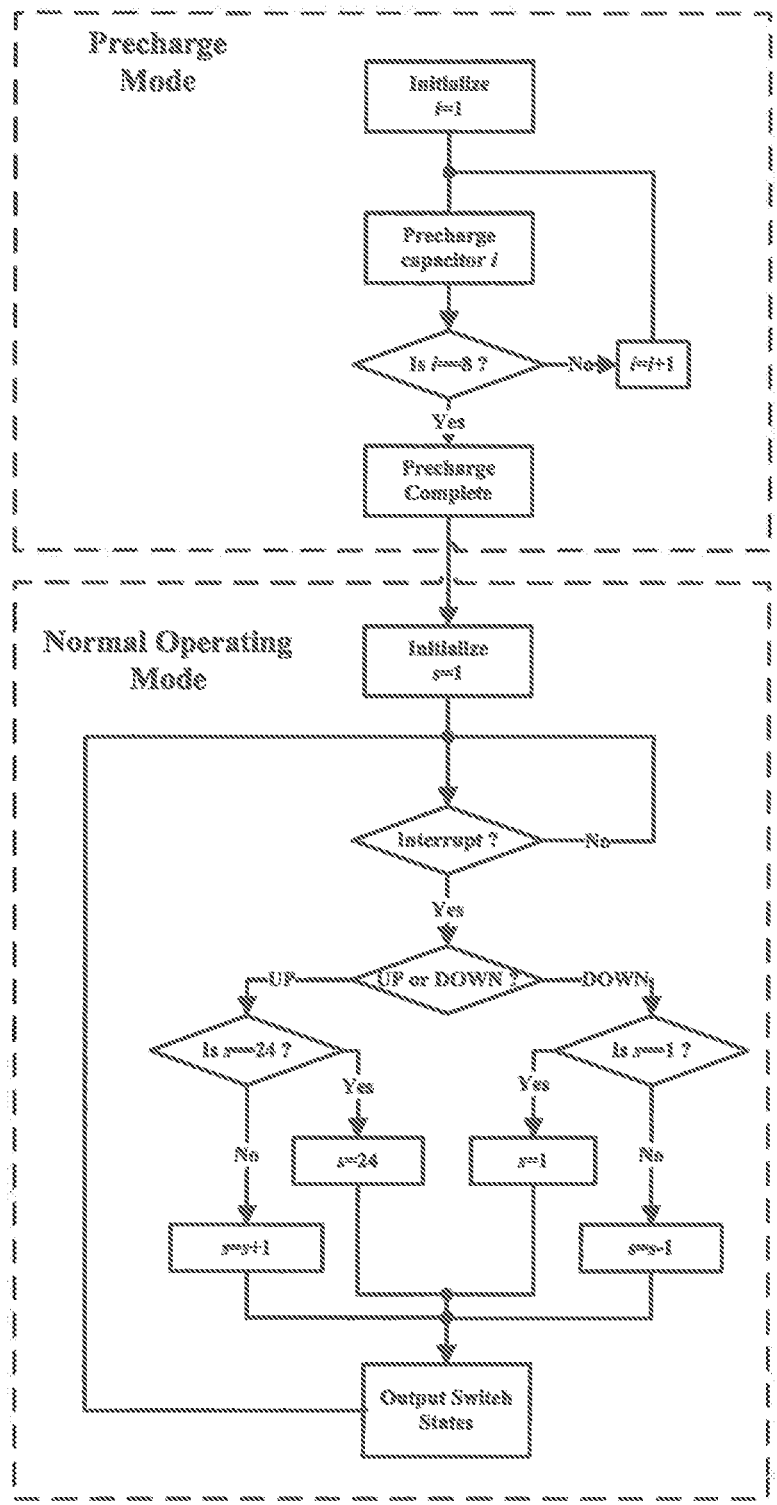
FIG. 10 is a flow chart illustrating control logic during precharge and normal operation of a 2-6 bipolar SSC energy buffer.

The flow chart of the precharge control is shown in FIG. 10. A scaled down version of the voltage across each capacitor is compared with a specified reference provided by the microcontroller through a digital to analog converter (DAC). The results of the comparison are fed back to the microcontroller to trigger an interrupt. During precharge, the microcontroller turns the switches on or off appropriately to connect the current source to the capacitor that needs to be charged. The states (on or off) of the switches for charging a particular capacitor during the precharge period are shown in Table II.

TABLE II

State of the switches during precharge of each of the eight capacitors of the 2-6 bipolar SSC energy buffer. Blank cell indicates the switch is off.

| | $C_{11}$ | $C_{12}$ | $C_{21}$ | $C_{22}$ | $C_{23}$ | $C_{24}$ | $C_{25}$ | $C_{26}$ |
| --- | --- | --- | --- | --- | --- | --- | --- | --- |
| $S_{11}$ | on | | | | | | | |
| $S_{12}$ | | on | | | | | | |
| $S_{21}$ | | | on | | | | | |
| $S_{22}$ | | | | on | | | | |
| $S_{23}$ | | | | | on | | | |
| $S_{24}$ | | | | | | on | | |
| $S_{25}$ | | | | | | | on | |
| $S_{26}$ | | | | | | | | on |
| $S_{h1}$ | | | | | | | | |
| $S_{h2}$ | on | on | | | | | | |
| $S_{h3}$ | | | | | | | | |
| $S_{h4}$ | | | on | on | on | on | on | on |
| $S_{p1}$ | on | on | on | on | on | on | on | on |
| $S_{p2}$ | on | on | on | on | on | on | on | on |
| $S_s$ | | | on | on | on | on | on | on |

First Sp1, Sp2, S21, Sh4 and Ss are turned on, and all the other switches are turned off to charge C21. The microcontroller senses the voltage of C21 (through the voltage divider formed by R21 and R22) and compares it with the specified precharge voltage (0.5 Vnom-160 V). Once the voltage of C21 reaches 160V, S21 is turned off and S22 is turned on to charge C22 to its specified precharge level. Similarly, C23, C24, C25 and C26 are charged one at a time to their designed initial level. Once C26 is charged, S26, Sh4 and Ss are turned off, and Sh2 and S11 are turned on to charge C11. Now the microcontroller senses the voltage of C11 (through the voltage divider formed by R11 and R12) and compares it with the specified precharge voltage (0.4 Vnom-128 V). Once the voltage of C11 is larger than 128 V, S11 is turned off and S12 is turned on to charge C12. Once all the capacitors are precharged, the precharge circuit is disconnected from the SSC energy buffer by switches Sp1 and Sp2, and the energy buffer enters normal operation.

Control

The normal operation of the energy buffer is also controlled by a state machine implemented in the ATMEL ATmega2560 microcontroller. The state machine controls the state (on or off) of the twelve switches in the SSC energy buffer power circuit. The state machine has a total of 24 states, with each state corresponding to a unique and valid combination of the states of the twelve switches, as shown in Table III.

TABLE III

| States | $S_{21}$ | $S_{22}$ | $S_{23}$ | $S_{24}$ | $S_{25}$ | $S_{26}$ | $S_{11}$ | $S_{12}$ | $S_{h1}$ | $S_{h2}$ | $S_{h3}$ | $S_{h4}$ |
|---|---|---|---|---|---|---|---|---|---|---|---|---|
| 1  | on |    |    |    |    |    | on | on | on |    |    |    |
| 2  |    | on |    |    |    |    | on | on | on |    |    |    |
| 3  |    |    | on |    |    |    | on | on | on |    |    |    |
| 4  |    |    |    | on |    |    | on | on | on |    |    |    |
| 5  |    |    |    |    | on |    | on | on | on |    |    |    |
| 6  |    |    |    |    |    | on | on | on | on |    |    |    |
| 7  |    |    |    |    |    | on | on |    |    | on |    | on |
| 8  |    |    |    |    | on |    | on |    |    | on |    | on |
| 9  |    |    | on |    |    |    | on |    |    | on |    | on |
| 10 |    | on |    |    |    |    | on |    |    | on |    | on |
| 11 | on |    |    |    |    |    | on |    |    | on |    | on |
| 12 |    |    |    | on |    |    | on |    |    | on |    | on |
| 13 | on |    |    |    |    |    |    | on | on |    | on |    |
| 14 |    | on |    |    |    |    |    | on | on |    | on |    |
| 15 |    |    | on |    |    |    |    | on | on |    | on |    |
| 16 |    |    |    | on |    |    |    | on | on |    | on |    |
| 17 |    |    |    |    | on |    |    | on | on |    | on |    |
| 18 |    |    |    |    |    | on |    | on | on |    | on |    |
| 19 |    |    |    |    |    | on |    |    |    | on | on | on |
| 20 |    |    |    |    | on |    |    |    |    | on | on | on |
| 21 |    |    |    | on |    |    |    |    |    | on | on | on |
| 22 |    |    | on |    |    |    |    |    |    | on | on | on |
| 23 |    | on |    |    |    |    |    |    |    | on | on | on |
| 24 | on |    |    |    |    |    |    |    |    | on | on | on |

The flow chart of the normal operation mode control logic of the energy buffer is shown in FIG. 10. In this flow chart, s denotes the current state of the state machine. The energy buffer starts normal operation in state 1 (i.e., s=1), which corresponds to minimum energy stored in the buffer, and starts to charge up. Once the bus voltage reaches the maximum allowed voltage, 1.1 Vnom (352 V), the UP interrupt is triggered and the state is incremented by one (i.e., s=s+1). The microcontroller turns the appropriate power switches on or off to match the configuration for the new state. This drops the bus voltage back to 0.9 Vnom (288 V), and the charging of the energy buffer continues until it again reaches the upper voltage limit. This process is repeated as long as the energy buffer is being charged and it has not reached state 24. Once the energy buffer has reached state 24, the state machine stays in state 24 even if it receives additional cUP interrupts. This helps protect the energy buffer to a certain extent in case load power exceeds its design specifications. During this overload condition the energy buffer looks like a 1.1_F capacitor to the external system. The energy buffer will return to normal operation once the load power returns to the design range.

During discharge of the energy buffer, the DOdWN interrupt is triggered when the bus voltage reaches the minimum allowed voltage, 0.9 Vnom (288 V). This decrements the state by one (i.e., s=s−1). The microcontroller turns the appropriate power switches on and off to match the configuration for the new state and the bus voltage increases to 1.1 Vnom (352 V). This process is repeated each time the bus voltage reaches the lower voltage limit until it has reached state 1. As in the case of charging, to protect the energy buffer, the state machine stays in state 1 even if it receives additional DOdWN interrupts. Hence during normal operation at maximum power, the state machine will iterate through states 1 through 24 in a sequential manner, first going from 1 to 24 as it charges, and then returning from 24 to 1 as it discharges, and this process is repeated as long as the energy buffer is in normal operation.

Artificial Voltage Feedback

In a conventional system with an energy buffering electrolytic capacitor at the output of the PFC, the PFC uses the bus voltage (i.e., the voltage across the buffering capacitor) to control its output current. The bus voltage is scaled down by a resistive divider and fed back to the PFC control chip.

Since the bus voltage is a good measure of the energy stored in the capacitor, this feedback mechanism ensures that the average output power from the PFC matches the power drawn by the dc load and the system stays stable. However, when the electrolytic capacitor is replaced with the SSC energy buffer, the bus voltage is no longer a true representation of the energy stored in the energy buffer. Hence, an artificial signal must be generated (and fed back to the PFC control chip) that represents the energy stored in the energy buffer and mimics the bus voltage of the electrolytic capacitor. In the exemplary circuit this function is performed by a second ATMEL ATmega2560 microcontroller.

In the precharge mode, the SSC energy buffer behaves simply like two capacitors connected in series. Hence, during this period, the bus voltage reflects the energy stored inside the two capacitors and so the voltage that needs to be fed back is simply a scaled version of the bus voltage.

Once the energy buffer enters normal operating mode, its stored energy increases monotonically as it goes from state 1 to state 24 and then decreases monotonically as it returns to state 1. The energy that gets stored in the energy buffer as it goes from state 1 to state 24 is given by:

$$\Delta E(t) = \sum_{i=1}^{N} \frac{1}{2}(C_i(V_i(t)^2 - V_{i0}^2)) \quad \text{Equation (5)}$$

Where:

N is the total number of capacitors in the energy buffer (eight in the 2-6 bipolar SSC case);

$C_i$ is the capacitance of capacitor i;

$V_i(t)$ is the voltage of capacitor i at time t; and $V_{i0}$ is the initial voltage of capacitor i after it is precharged.

In the exemplary circuit all eight capacitors have the same capacitance Cb (equal to 2.2_F). The effective energy in the energy buffer as a function of time is given by:

$$Eb(eq)(t) = \frac{1}{2} C_{eq} V_{min}^2 + \Delta E(t) \quad \text{Equation (6)}$$

where Ceq is an equivalent capacitance for this energy buffer valid while it is operating in normal operating mode, and is given by:

$$C_{eq} = \frac{2 \int_{t_1}^{t_2} p(t)\, dt}{V_{t_2}^2 - V_{t_1}^2} \quad \text{Equation (7)}$$

It should be noted that Eb(eq) as given by Equation 6 is not the actual energy in the energy buffer but rather the apparent energy.

Here p(t) is the power flowing into the energy buffer, and Vt1 and Vt2 are the voltages at beginning (time t1) and the end (time t2) of the charging period, respectively. For the exemplary system, Ceq is equal to 26.4_F. Hence, the voltage that needs to be fed back in normal operating mode is given by:

$$V_{fb}(t) = \sqrt{\frac{C_{eq}V_{min}^2 + 2\Delta E(t)}{C_{eq}}} \quad \text{Equation (8)}$$

This feedback signal reflects the apparent energy stored in the energy buffer. While the expression given by Eq. 8 for the normal operating mode feedback signal can be implemented, it is simpler to implement an approximation to this expression which works just as well within the resolution of our 8-bit digital to analog converter (DAC). The approximate feedback signal is derived assuming that the feedback voltage signal is linear between two switching instances and the current flowing into or out of the energy buffer is constant (i.e., current has a square profile).

This approximate feedback voltage is given by:

$$V_{fb(approx)}(t) = V_{min} + (V_{max} - V_{min})(i/24) + (V_{bus}(t) - V_{min})(C_L/2C_{eq}) \quad \text{Equation (9)}$$

Figure 11:
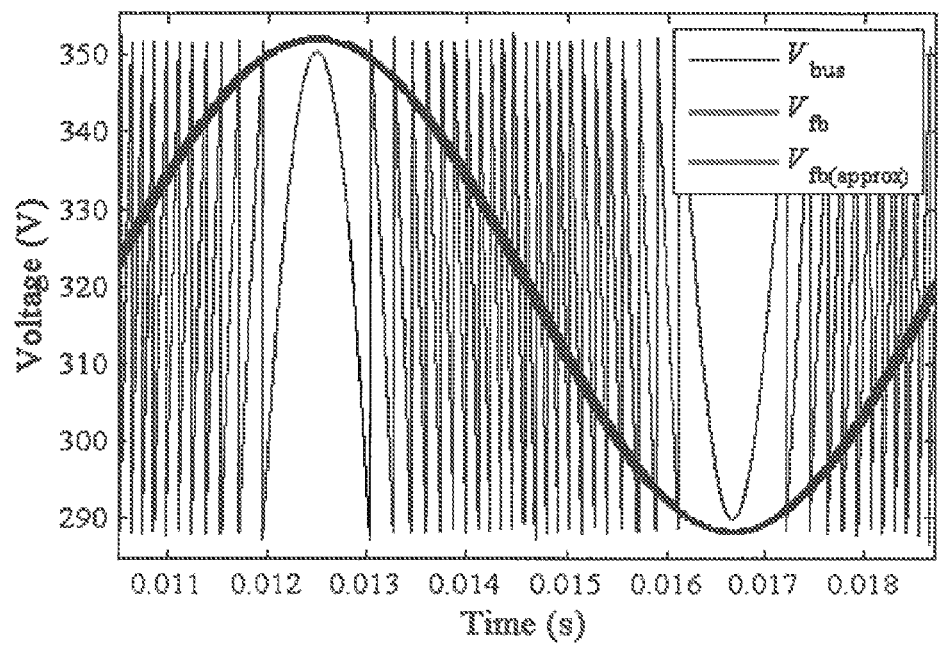
FIG. 11 is a plot which illustrates Comparisons between the accurate (Vfb) and approximate (Vfb(approx)) artificial feedback voltages for a sinusoidal energy buffer terminal current.

FIG. 11 shows that this approximate feedback signal matches the more accurate one quite well even when the terminal current of the energy buffer is sinusoidal. It has been experimentally demonstrated that the slower outer control loop of the PFC works well with this approximate feedback signal.

The exemplary 2-6 bipolar SSC energy buffer was successfully tested with the PFC and a load resistor up to power levels of 135 W. The measured waveforms from the energy buffer operated at 100 W are shown in FIG. 12. As the energy flows into and out of the energy buffer at 120 Hz, the backbone capacitors charge and discharge over a wide voltage range. However, this voltage variation is compensated for by the supporting capacitors and the bus voltage remains within the 300 V and 370 V range. Hence, it meets the voltage ripple ratio design requirement of 10%.

Figures 12A, 12B:
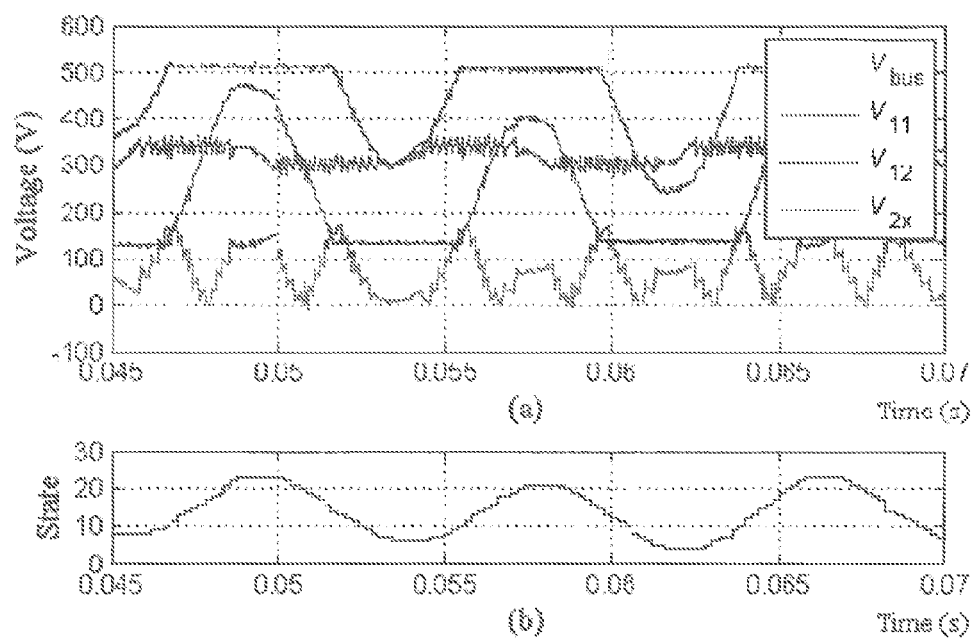
FIGS. 12A, 12B are plots of measured waveforms of (a) bus voltage (Vbus), backbone capacitor voltages (V11 and V12) and voltage across the supporting capacitor that is charging or discharging at the time (V2x), and (b) corresponding state (1-24) of the state machine.
Figures 13A, 13B:
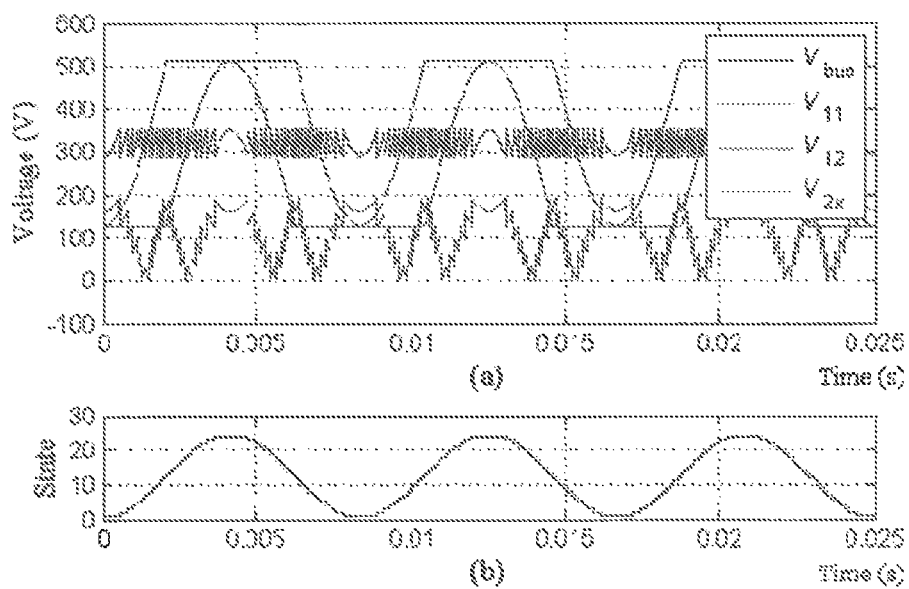
FIGS. 13A, 13B are simulated waveforms of (a) bus voltage (Vbus), backbone capacitor voltages (V11 and V12) and voltage across the supporting capacitor that is charging or discharging at the time (V2x), and (b) corresponding state (1-24) of the state machine.

A PLECS4 model for this energy buffer was been built and simulated. In the simulation the terminal current of the energy buffer is assumed to be sinusoidal. Comparing FIG. 12 and FIG. 13, there is a reasonably close match between the experimental and simulated waveforms. The main difference is due to the fact that in the simulation the terminal current of the energy buffer is assumed to be perfectly sinusoidal, while in the case of the experimental setup that is not exactly the case. FIG. 12(b) shows the state of the state machine. As can be seen, the state machine goes down to state 4 and up to state 24. The state machine does not go into states 1, 2 and 3 in its normal operating mode as the load power is not large enough to discharge it down to its minimum stored energy level. The circuit behaves as designed, and validates the concept of the stacked switched capacitor energy buffer.

Figures 14A, 14B, 14C:
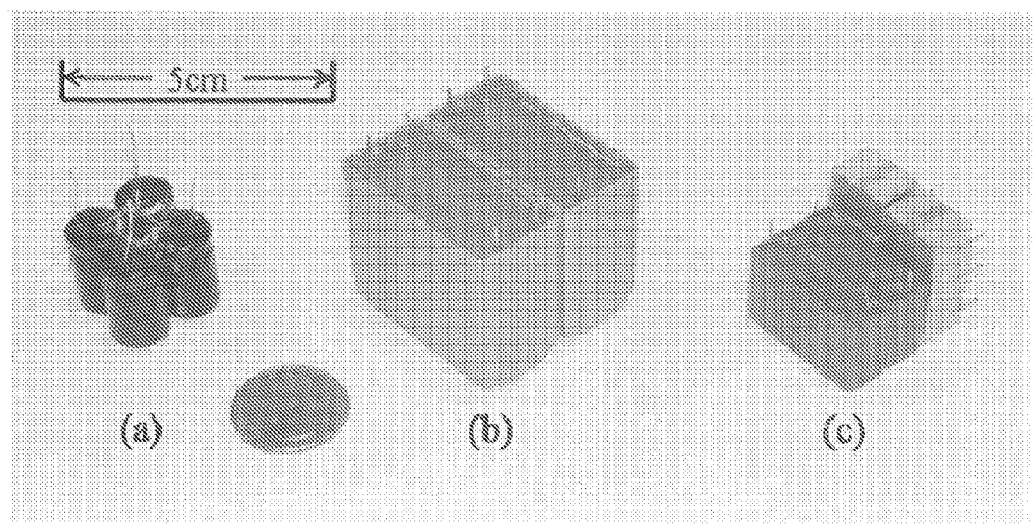
FIGS. 14A, 14B AND 14C illustrate relative sizes of passive energy storage components in different energy buffer architectures: (a) electrolytic-capacitoronly (9 cm3) (b) film-capacitor-only (65 cm3) and (c) filmcapacitor-based SSC (20 cm3) energy buffer.

The round trip efficiency of the prototype 2-6 bipolar SSC energy buffer was measured for the 80 W to 123 W load power range. This efficiency stays above 94.4% throughout this power range. The peak measured efficiency is 95.5%. The measured efficiency does not include losses in the control and gate drive circuit as these parts were not designed for high efficiency. The control and gate drive losses can be minimized by appropriately designing these parts of the energy buffer. The prototype energy buffer successfully replaces the function of the electrolytic capacitor at the output of the PFC. Its passive volume of 20 cm3, which is much smaller than the 65 cm3 needed for a film-capacitor-only solution, is only about twice the size of the 9 cm3 electrolytic capacitor it replaces, as shown in FIG. 14. Hence, the SSC energy buffer achieves energy buffering density comparable to an electrolytic capacitor while providing much longer life.

A stacked switched capacitor (SSC) architecture for dc-link energy buffering applications, including buffering between single-phase ac and dc has been described. This architecture utilizes the energy storage capability of capacitors more effectively than previous designs, while maintaining the bus voltage within a narrow range. This enables the energy buffer to achieve higher effective energy density and reduce the volume of the capacitors. A prototype 2-6 bipolar SSC energy buffer using film capacitors designed for a 320 V bus with 10% voltage ripple and able to support a 135 W load was built and tested and it is shown that the SSC energy buffer can successfully replace limited-life electrolytic capacitors with much longer life film capacitors, while maintaining volume and efficiency at a comparable level.

The techniques described herein are not limited to the specific embodiments described. Elements of different embodiments described herein may be combined to form other embodiments not specifically set forth above. Other embodiments not specifically described herein are also within the scope of the following claims.

What is claimed is:
1. A grid interface power converter system comprising:
   a stacked switched capacitor (SSC) energy buffer circuit coupled between a DC-DC converter and an AC-DC converter, said stacked switched capacitor (SSC) energy buffer circuit comprising:
      two sub-circuits that serially coupled during a first operating mode wherein each sub-circuit comprises one or more capacitors, and at least one sub-circuit further comprises a plurality of switches disposed to selectively couple the capacitors to: (a) enable dynamic reconfiguration of how the capacitors are coupled to the terminals of the subcircuit; and (b) dynamically reconfigure the interconnection among the capacitors within the subcircuit.

2. The circuit of claim 1 said SSC energy buffer circuit comprises:
   a first set of circuitry comprising:
      m capacitors; and
      m switches, each in switch serially coupled to a corresponding one of the m capacitors; and
   a second set of circuitry comprising:
      n capacitors; and
      n switches, each n switch in series with a corresponding one of the n capacitors;
   wherein a voltage across the first set of circuitry and the second set of circuitry is a bus voltage.

3. The circuit of claim 1 wherein the SSC energy buffer circuit is configured to maintain the bus voltage within ±12.5% of a nominal value.

4. The SSC energy buffer circuit of claim 1 wherein the switches in at least one of the two sub-circuits are arranged to dynamically reconfigure a polarity with which at least one capacitor is connected to the terminals of the sub-circuit.

5. The SSC energy buffer circuit of claim 1, further comprising a pre-charge circuit coupled to each of the two sub-circuits said pre-charge circuit operable to charge each of the one or more capacitors in the two sub-circuits to specified initial conditions before entering the first operating mode.

6. The SSC energy buffer circuit of claim 1 wherein at least one subcircuit comprises a plurality of sub-sub-circuits connected in parallel, wherein each sub-sub-circuit comprises a switch serially coupled to a capacitor.

7. The SSC energy buffer circuit of claim 1 wherein the peak energy storage capability of one of the two sub-circuits is greater than 66% of the total peak energy storage capability.

\* \* \* \* \*